(12) United States Patent
Han et al.

(10) Patent No.: US 12,483,079 B2
(45) Date of Patent: Nov. 25, 2025

(54) MOTOR ASSEMBLY AND CLEANER INCLUDING SAME

(71) Applicant: SAMSUNG ELECTRONICS CO., LTD., Suwon-si (KR)

(72) Inventors: Jihoon Han, Suwon-si (KR); Wonsoo Kang, Suwon-si (KR); Younmo Kang, Suwon-si (KR); Jimin Kim, Suwon-si (KR); Taesang Park, Suwon-si (KR); Jinwoo Han, Suwon-si (KR); Woong Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 399 days.

(21) Appl. No.: 18/090,045

(22) Filed: Dec. 28, 2022

(65) Prior Publication Data

US 2023/0140359 A1    May 4, 2023

Related U.S. Application Data

(63) Continuation of application No. PCT/KR2021/007633, filed on Jun. 17, 2021.

(30) Foreign Application Priority Data

Jul. 27, 2020 (KR) ..................... 10-2020-0093357

(51) Int. Cl.
*H02K 1/27* (2022.01)
*A47L 5/22* (2006.01)
*H02K 7/14* (2006.01)

(52) U.S. Cl.
CPC ............. *H02K 1/27* (2013.01); *A47L 5/22* (2013.01); *H02K 7/14* (2013.01); *H02K 2213/03* (2013.01)

(58) Field of Classification Search
CPC ........ H02K 1/27; H02K 7/14; H02K 2213/03; A47L 5/22
See application file for complete search history.

(56) References Cited

U.S. PATENT DOCUMENTS

| 5,859,486 A | * | 1/1999 | Nakahara | ............... H02K 1/148 310/216.084 |
|---|---|---|---|---|
| 6,167,610 B1 | | 1/2001 | Nakahara et al. | |

(Continued)

FOREIGN PATENT DOCUMENTS

| CN | 209805516 U | 12/2019 |
|---|---|---|
| JP | 8-19196 | 1/1996 |

(Continued)

OTHER PUBLICATIONS

International Search Report, PCT/ISA/210, dated Sep. 27, 2021, issued in PCT Application No. PCT/KR2021/007633.

(Continued)

*Primary Examiner* — Andrew A Horton
(74) *Attorney, Agent, or Firm* — STAAS & HALSEY LLP

(57) ABSTRACT

A motor assembly including a rotor rotatable about a rotating shaft; a stator formed as a continuous body and including multiple teeth areas, multiple body areas disposed outside of the multiple teeth areas and having a first width in a cross section of the stator in a direction perpendicular to a rotational axis of the rotating shaft, with the plurality of teeth areas extending from the plurality of body areas in a direction toward the rotating shaft, and multiple connection areas connecting multiple body areas; and a coil wound around each of the multiple teeth areas, wherein each of the multiple connection areas has a bending point having a second width in the cross section of greater than or equal to 0.05 and less than or equal to 0.25 of the first width, and is (Continued)

in contact with another connection area with reference to the bending point.

15 Claims, 11 Drawing Sheets

(56) References Cited

U.S. PATENT DOCUMENTS

| | | | |
|---|---|---|---|
| 6,362,553 B1 | 3/2002 | Nakahara et al. | |
| 11,089,931 B2 | 8/2021 | Yoshida et al. | |
| 2003/0188397 A1* | 10/2003 | Syverson | A47L 9/0411 |
| | | | 15/389 |
| 2005/0067912 A1 | 3/2005 | Murakami et al. | |
| 2013/0169106 A1 | 7/2013 | Yokogawa et al. | |
| 2017/0101996 A1 | 4/2017 | Zhou et al. | |
| 2018/0249873 A1 | 9/2018 | Yoshida et al. | |
| 2019/0082917 A1 | 3/2019 | Shiozawa et al. | |
| 2019/0305620 A1* | 10/2019 | Sawada | H02K 1/28 |

FOREIGN PATENT DOCUMENTS

| | | |
|---|---|---|
| JP | 3017085 | 3/2000 |
| JP | 2004-312790 | 11/2004 |
| JP | 2006-17021 | 1/2006 |
| JP | 2009-27777 | 2/2009 |
| JP | 2012-85534 | 4/2012 |
| JP | 5435212 | 3/2014 |
| JP | 6102249 | 3/2017 |
| JP | 2017-227156 | 12/2017 |
| JP | 2018-143473 | 9/2018 |
| JP | 2019-54671 | 4/2019 |
| KR | 10-2015-0106207 | 9/2015 |
| KR | 10-2015-0140200 | 12/2015 |
| KR | 10-2017-0044024 | 4/2017 |

OTHER PUBLICATIONS

Written Opinion, PCT/ISA/237, dated Sep. 27, 2021, issued in PCT Application No. PCT/KR2021/007633.
Office Action dated June 18, 2024, issued in Korean Patent Application No. 10-2020-0093357

* cited by examiner

FIG. 6

| $H_2/H_1$ | $f_0$ | $H_2/H_1$ | $f_0$ |
|---|---|---|---|
| 7.5% | 675 Hz | 50% | 2752 Hz |
| 12.5% | 1056 Hz | 62.5% | 2997 Hz |
| 18.75% | 1472 Hz | 75% | 3152 Hz |
| 25% | 1824 Hz | 87.5% | 3240 Hz |
| 31.25% | 2117 Hz | 100% | 3269 Hz |

MOTOR ASSEMBLY AND CLEANER INCLUDING SAME

CROSS-REFERENCE TO RELATED APPLICATIONS

This application is a continuation of International Application PCT/KR2021/007633, filed Jun. 17, 2021, and claims foreign priority to Korean application 10-2020-0093357 filed Jul. 27, 2020, the disclosures of which are incorporated herein by reference in their entireties.

BACKGROUND

1. Field

The present disclosure relates to a motor assembly and a cleaner including the same, and more particularly, to a motor assembly with an improved structure for reducing high-frequency noise and improving its performance by allowing a stator formed as one continuous body to have a limited width ratio of a body area to that of a connection area, and a cleaner including the same.

2. Description of Related Art

A general motor may be a device that obtains a rotational force from electrical energy, and include a stator and a rotor. The stator and the rotor may electromagnetically interact with each other to rotate the rotor.

A motor assembly including the motor may be used in various home appliances by using the rotational force of the motor, and may be used, for example, in a cleaner, a fan, a washing machine, or the like. Among these home appliances, the cleaner may be a device that suctions air on a surface to be cleaned, separates dust or pollutant from the suctioned air, collect the same, and discharges purified air to the outside of its body.

The home appliance such as the cleaner has been required to be smaller and lighter and to simultaneously have improved performance, and the motor assembly of the cleaner thus needs to have reduced noise and increased suction power while having a smaller size.

In particular, it has been difficult for a small motor assembly having a diameter of 60 mm or less to wind a coil on the stator and assemble the motor assembly, and there has been a need for its structural improvement for smooth air flow from an impeller to an outlet.

In addition, a natural frequency of the stator may be formed in a range of a resonance frequency determined by a rotation frequency of the motor assembly, and in this case, high-frequency noise caused by a resonance phenomenon may occur, thus lowering stability of the motor.

SUMMARY

According to an embodiment of the present disclosure, a motor assembly includes: a rotor rotatable about a rotating shaft; a stator formed as one continuous body, and including a plurality of teeth areas, a plurality of body areas disposed outside the plurality of teeth areas and having a first width in a cross section of the stator in a direction perpendicular to a rotational axis of the rotating shaft, with the plurality of teeth areas extending from the plurality of body areas in a direction toward the rotating shaft, and a plurality of connection areas connecting the plurality of body areas with each other; and a coil wound on each of the plurality of teeth areas, wherein each of the plurality of connection areas includes a bending point having a second width in the cross section of the stator in the direction perpendicular to the rotational axis of the rotating shaft of greater than or equal to 0.05 and less than or equal to 0.25 of the first width, and is in contact with another connection area based on the bending point.

In this case, each of the plurality of body areas may be bent twice in the direction toward the rotating shaft.

Meanwhile, one connection area among the plurality of connection areas may have a protruding area disposed in an area in contact with another connection area, and another connection area in contact with the one connection area among the plurality of connection areas may have a receiving area positioned opposite to the protruding area and receiving the protruding area.

Meanwhile, the motor assembly may be rotataboe at 30,000 to 200,000 revolutions per minute (RPM).

Meanwhile, the rotor may have four poles or more of magnet.

Meanwhile, the stator may have a diameter of 50 mm or less.

Meanwhile, the motor assembly may further include an insulator surrounding the stator, wherein the coil is wound on the insulator.

Meanwhile, the motor assembly may further include: an impeller having a plurality of blades and connected to the rotating shaft; and a housing including an outlet configured to discharge air suctioned into the impeller and supporting the stator.

In this case, the coil may be suppliable with a three-phase current and be delta-connected, and the outlet may be configured to discharge air to the outside of an outer circumferential surface of the motor assembly.

According to another embodiment of the present disclosure, a cleaner includes: a cleaner body; a suction head configured to suction a foreign material on a surface to be cleaned into the cleaner body; and a motor assembly disposed in the cleaner body and configured to provide suction power to the suction head, wherein the motor assembly includes: a rotor rotatable about a rotating shaft; a stator formed as one continuous body, and including a plurality of teeth areas, a plurality of body areas disposed outside the plurality of teeth areas and having a first width in a cross section of the stator in a direction perpendicular to a rotational axis of the rotating shaft, with the plurality of teeth areas extending from the plurality of body areas in a direction toward the rotating shaft, and a plurality of connection areas connecting the plurality of body areas with each other; and a coil wound on each of the plurality of teeth areas, wherein each of the plurality of connection areas includes a bending point having a second width in the cross section of the stator in the direction perpendicular to the rotational axis of the rotating shaft of greater than or equal to 0.05 and less than or equal to 0.25 of the first width, and is in contact with another connection area based on the bending point.

In this case, one connection area among the plurality of connection areas may have a protruding area disposed in an area in contact with another connection area, and another connection area in contact with the one connection area among the plurality of connection areas may have a receiving area positioned opposite to the protruding area and receiving the protruding area.

Meanwhile, the motor assembly may be rotatable at 30,000 to 200,000 revolutions per minute (RPM).

Meanwhile, the stator may have a diameter of 50 mm or less.

Meanwhile, the cleaner may further include: an impeller having a plurality of blades and connected to the rotating shaft; and a housing including an outlet to discharge air suctioned into the impeller and supporting the stator.

In this case, the coil may be supplied with a three-phase current and be delta-connected, and the outlet may be configured to discharge air to the outside of an outer circumferential surface of the motor assembly.

Additional aspects will be set forth in part in the description which follows and, in part, will be apparent from the description, or may be learned by practice of the presented embodiments.

BRIEF DESCRIPTION OF THE DRAWINGS above and other aspects, features, and advantages of certain embodiments of the present disclosure will be more apparent from the following description taken in conjunction with the accompanying drawings, in which:

FIG. 6 is a table showing a natural frequency of the stator based on a ratio of a second width to a first width.

DETAILED DESCRIPTION

Figure 1:
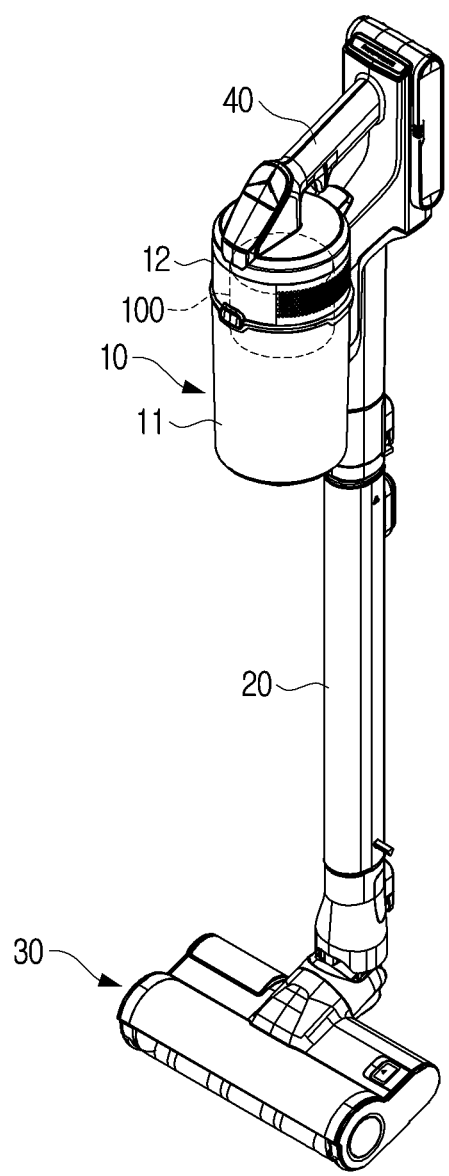
FIG. 1 is a perspective view of a cleaner including a motor assembly according to an embodiment of the present disclosure.

Embodiments described below are illustratively provided to assist in understanding of the present disclosure, and it is to be understood that the present disclosure may be variously modified and executed unlike the embodiments described herein. In describing the present disclosure, omitted is a detailed description of a case where it is decided that the detailed description for the known functions or configurations related to the present disclosure may unnecessarily obscure the gist of the present disclosure. Further, the accompanying drawings are not illustrated to scale, and sizes of some of components may be exaggerated to assist in the understanding of the present disclosure.

A term used in this specification and the claims is selected in consideration of its function in the present disclosure. However, this term may be changed based on intentions of those skilled in the art to which the present disclosure pertains, legal or technical interpretations, and emergences of new technology. In addition, some terms are arbitrarily selected by the applicant. This term may be interpreted to have the meaning defined in this specification, and if there is no specific definition of the term, it may be interpreted based on a general content of this specification and common technical knowledge in the art.

In describing the present disclosure, a sequence of each operation should be understood as non-restrictive unless a preceding operation in the sequence of each operation needs to logically and temporally precede a subsequent operation. That is, except for the above exceptional case, the essence of the present disclosure is not affected even when a process described as the subsequent operation is performed before a process described as the preceding operation, and the scope of the present disclosure should also be defined regardless of the sequences of the operations.

In the present disclosure, an expression "have," "may have," "include," "may include" or the like, indicates the existence of a corresponding feature (for example, a numerical value, a function, an operation or a component such as a part), and does not exclude the existence of an additional feature.

Terms such as "first," "second," and the like, may be used to describe various components, and the components are not to be interpreted to be limited to the terms. These terms may be used to distinguish one component from another component. For example, a "first" component may be named a "second" component and the "second" component may also be similarly named the "first" component, without departing from the scope of the present disclosure.

In addition, terms such as "front end," "rear end," "upper surface," "lower surface," "side surface," "left side," "right side," "upper portion," "lower portion," "area," and the like, used in the present disclosure are defined based on the drawings. The shapes and positions of respective components are not limited to these terms.

In addition, this specification describes components necessary for describing each embodiment of the present disclosure, and the present disclosure is not necessarily limited thereto. Accordingly, some components may be changed or omitted, and other components may be added. In addition, the components may be distributed and arranged in different independent devices.

Furthermore, the embodiment of the present disclosure is described in detail with reference to the accompanying drawings and the contents shown in the accompanying drawings, and the present disclosure is not limited or restricted to the embodiments.

Various embodiments of the present disclosure provide a motor assembly with an improved structure for reducing noise and improving its performance, and a cleaner including the same.

According to a motor assembly and a cleaner including the same in various embodiments of the present disclosure, it is possible to reduce noise of the motor assembly and improve its driving performance through disclosed configurations, solve noise problems that occur when the cleaner is driven, and improve its suction power.

Hereinafter, the present disclosure is described in more detail with reference to FIGS. 1 through 10.

FIG. 1 is a perspective view of a stick-type cleaner 1 including a motor assembly 100 according to an embodiment of the present disclosure.

Referring to FIG. 1, a cleaner including the motor assembly 100 according to an embodiment of the present disclosure may be the stick-type cleaner 1. However, the present disclosure is not limited thereto, and the motor assembly 100 according to an embodiment of the present disclosure may be applied to various devices. For example, the cleaner 1 according to an embodiment of the present disclosure may be an upright-type or handy-type cleaner.

In addition, the motor assembly 100 according to an embodiment of the present disclosure may be applied to various home appliances in addition to the cleaner. Hereinafter, the description exemplifies the stick-type cleaner 1 including the motor assembly 100.

The cleaner 1 may include a cleaner body 10 and a suction head 30. The cleaner 1 may include a stick 20 connecting the cleaner body 10 and the suction head 30 with each other, and a handle part 40 connected to the cleaner body 10.

The handle part 40 may be a part coupled to the cleaner body 10, and provided for the user to manipulate the cleaner 1 by holding the handle part. The handle part 40 may include a manipulation device (not shown), and the user may control the cleaner 1.

The suction head 30 may be positioned at a lower portion of the cleaner body 10 and disposed to be in contact with a surface to be cleaned. The suction head 30 may introduce dust or pollutant on the surface to be cleaned into the cleaner body 10 by using suction power generated from the motor assembly 100 in contact with the surface to be cleaned.

The cleaner body 10 may include a dust collector 11 and a driving device 12 disposed therein. The dust collector 11 may perform a function of collecting dust by separating a foreign material from air suctioned by the suction head 30.

The driving device 12 may include the motor assembly 100 driving the cleaner 1. The motor assembly 100 may generate power to generate the suction power inside the cleaner body 1.

Figure 2:
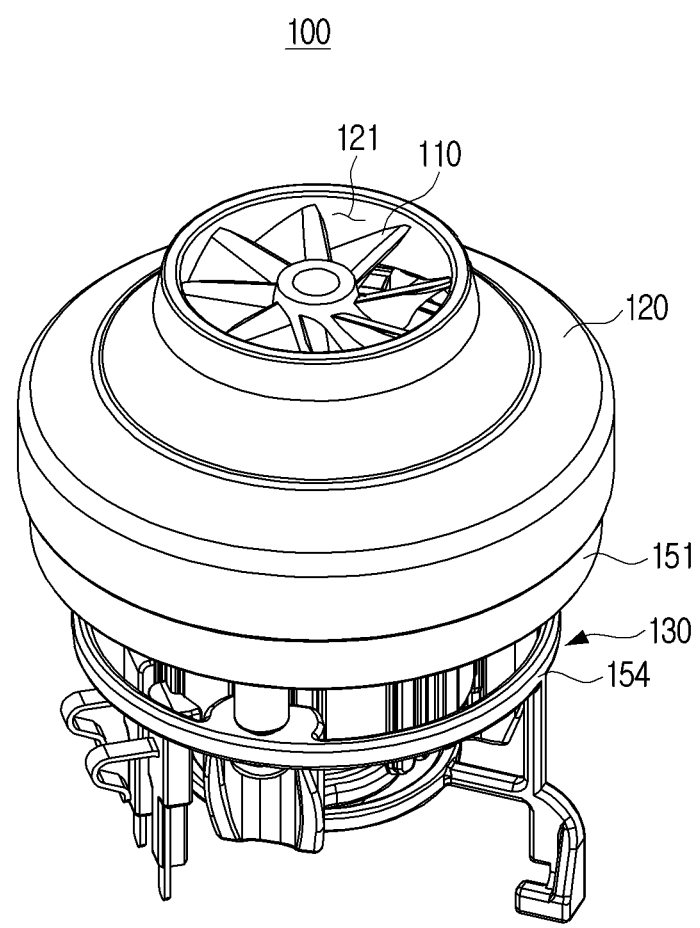
FIG. 2 is a perspective view of the motor assembly according to an embodiment of the present disclosure.
Figure 3:
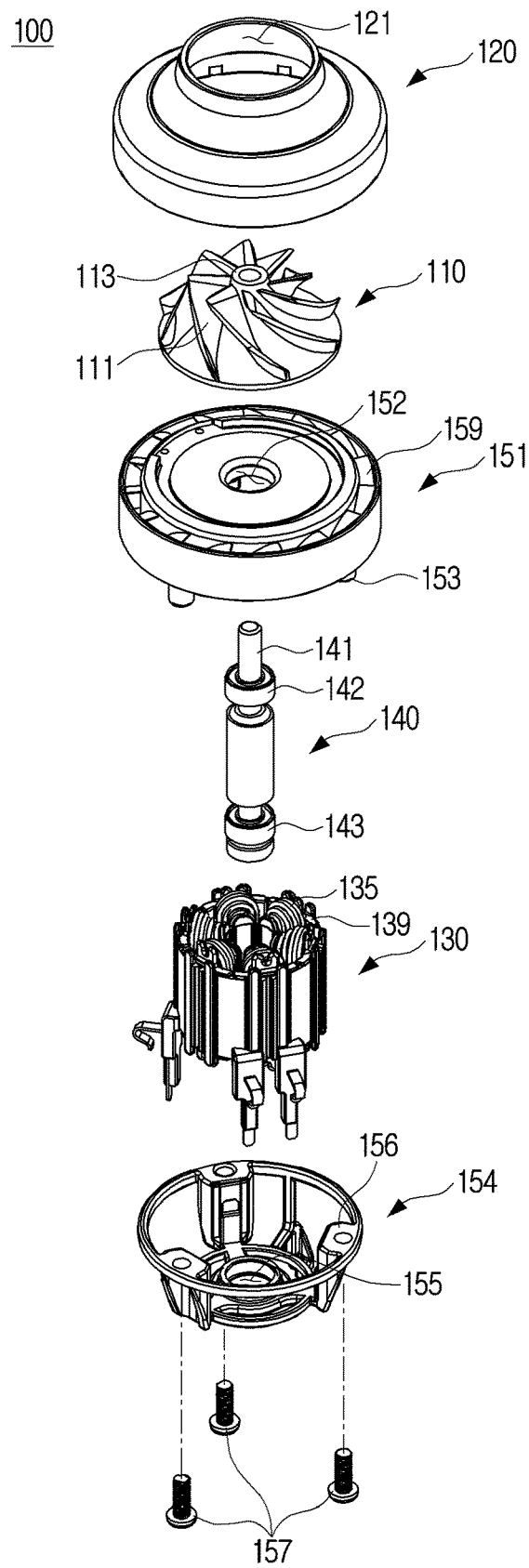
FIG. 3 is an exploded perspective view of the motor assembly according to an embodiment of the present disclosure.

FIG. 2 is a perspective view of the motor assembly 100 according to an embodiment of the present disclosure; and FIG. 3 is an exploded perspective view of the motor assembly 100 according to an embodiment of the present disclosure.

Referring to FIGS. 2 and 3, the motor assembly 100 may include: a motor including a stator 130, a rotor 140 and housings 151 and 154; an impeller 110 coupled to a rotating shaft 141 of the rotor 140 to generate an air flow; and an impeller cover 120 covering the impeller 110 and guiding air suctioned by the impeller 110.

In addition, although not shown in FIG. 2 or 3, the motor assembly 100 may include a substrate (not shown) controlling the motor assembly 100.

The motor may include the stator 130, the housings 151 and 154 coupled to the stator 130, and the rotor 140 rotatably disposed inside the stator 130.

The stator 130 may generate magnetic flux when a current is applied to a coil wound on the stator 130. The stator 130 may include an insulator 139 surrounding the stator 130, and a coil 135 may be wound on an outer surface of the insulator 139.

A space for accommodating the rotor 140 may be positioned in a center of the stator 130. The rotor 140 may electromagnetically interact with the stator 130. The rotor 140 may include the rotating shaft 141 and bearings 142 and 143.

The rotating shaft 141 may be rotated when the rotor 140 electromagnetically interacts with the stator 130.

The bearings 142 and 143 may include the first bearing 142 coupled to an upper side of the rotating shaft 141 and the second bearing 3 coupled to a lower side of the rotating shaft 141.

The first bearing 142 may be disposed between the first housing 151 and the rotating shaft 141 to support the rotating shaft 141 to be rotated while a rotational axis of the rotating shaft 141 is fixed.

The second bearing 143 may be disposed between the second housing 154 and the rotating shaft 141 to support the rotating shaft 141 to be rotated while the rotational axis of the rotating shaft 141 is fixed.

The housings 151 and 154 may be coupled to the outside of the stator 130, and respectively coupled to the bearings 142 and 143 to support the rotating shaft 141 and the stator 130. The housings 151 and 154 may include the first housing 151 coupled to one side of the stator 130 and the second housing 154 coupled to the other side of the stator 130.

The first housing 151 and the second housing 154 may be coupled with each other while having the rotor 140 and the stator 130 interposed therebetween. The rotor 140 may be disposed inside the stator 130 as the first housing 151 and the second housing 154 are coupled with each other.

The first housing 151 may include a first bearing seating part 152 on which the first bearing 142 is seated, and a first coupling part 153 extending in an axial direction and coupled to the second housing 154.

The first housing 151 may have a substantially cylindrical shape, and the first coupling part 153 may extend from the first housing 151 in the axial direction. The plurality of first coupling parts 153 may be spaced apart from each other in a circumferential direction of the first housing 151. For example, as shown in FIG. 3, three first coupling parts 153 may be provided, and the number of the first coupling parts 153 is not limited thereto.

The first housing 151 may include an outlet 159 discharging air suctioned into the impeller 110, and the first housing 151 may guide suctioned air from the impeller 110 to the outlet 159. The outlet 159 is described in detail with reference to FIGS. 9 and 10.

The second housing 154 may include a second bearing seating part 155 on which the second bearing 143 is seated and a second coupling part 156 coupled with the first coupling part 153 of the first housing 151.

The number of the second coupling parts 156 may correspond to the number of the first coupling parts 153. The first coupling part 153 and the second coupling part 156 may be coupled with each other by any of various known methods. For example, the first coupling part 153 and the second coupling part 156 may be screw-coupled with each other by using a bolt 157.

The motor assembly 100 may include the impeller 110 and the impeller cover 120. The impeller 110 may be coupled to the rotating shaft 141 of the rotor 140 to generate the air flow. The impeller cover 120 may cover the impeller 110.

The impeller 110 may include a shaft coupling part 113 to which the rotating shaft 141 is coupled. The impeller 110 may be rotated together with the rotating shaft 141 when the rotating shaft 141 is mounted into the shaft coupling part 113.

The impeller 110 may include a plurality of blades 111 generating the air flow.

The impeller cover 120 or 54 may be spaced apart from the impeller 110 or 53 at a predetermined distance.

Figure 4:
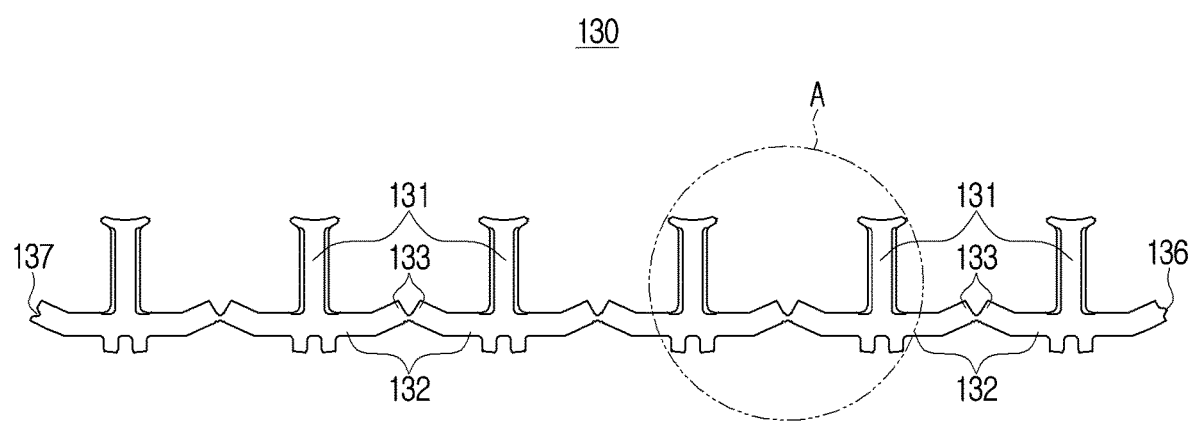
FIG. 4 is a plan view of a stator before being bent according to an embodiment of the present disclosure.

FIG. 4 is a plan view of the stator 130 before being bent according to an embodiment of the present disclosure.

Referring to FIG. 4, the stator 130 may be formed as one continuous body, and have a plurality of teeth areas 131, a plurality of body areas 132, and a plurality of connection areas 133.

The plurality of teeth areas 131 may be areas extending from the body area 132 in one direction, and the extending one direction may be a direction toward the rotating shaft 141 after being bent.

The coil 135 may be wound on the plurality of teeth areas 131. The plurality of teeth areas 131 may be disposed adjacent to the rotor 140 by extending toward the rotating shaft 141, and the rotor 140 and the stator 130 may electromagnetically interact with each other by the current flowing in the coil 135 wound on each of the plurality of teeth areas 131, thereby rotating the rotor 140.

The plurality of body areas 132 may be disposed outside the plurality of teeth areas 131, support the plurality of teeth areas 131, and correspond to a yoke area of a general stator.

Each of the plurality of body areas 132 may be bent twice in the direction of the rotating shaft 141. A shape of the stator 130 in which the plurality of connection areas 133 are bent and connected with each other may thus have a polygonal cross-section.

For example, as shown in FIG. 4, the plurality of body areas 132 may include six areas, and in this case, the bent areas of other body areas 132 adjacent to each other may be connected to each other, and the stator 130 may have a hexagonal or dodecagonal cross-section based on a length of the bent area.

The plurality of connection areas 133 may connect the plurality of body areas 132 with each other, and the plurality of connection areas 133 may each include a bending point 138. In addition, the stator 130 may be formed as one continuous body.

The stator 130 may have a structure in which electrical steel sheets forming one continuous body are punched, stacked, and bent for both ends thereof to be connected with each other. The connection area 133 configuring one continuous body together with the plurality of body areas 132 may be positioned between the plurality of body areas 132. The stator 130 bent into one continuous body may also be referred to as a "chain core type."

In a bending process of the stator 130, the bending point 138 of the connection area 133 may be bent, and a surface of both ends of the connection area 133 adjacent to the bending point 138 may come into contact with an opposite surface of the other connection area 133.

One connection area 133 in which another adjacent connection area 133 is not positioned among the plurality of connection areas 133 may have a protruding area 136 disposed in an area in contact with another connection area 133, and another connection area 133 in which another adjacent connection area 133 is not positioned and which is bent to be in contact with the connection area 133 having the protruding area 136 among the plurality of connection areas 133 may be positioned opposite to the protruding area 136 and have a receiving area 137 receiving the protruding area 136.

The protruding area 136 and the receiving area 137 may respectively have concavo-convex shapes to correspond to each other, and when the receiving area 137 receives the protruding area 136, the two areas may be welded to connect both the ends of the stator 130.

The rotor 140 and rotating shaft 141 of the motor assembly 100 may be rotated at a high speed, generate vibration, and noise may occur here based on a natural frequency of the stator 130 and the number of poles and rotations of the motor.

Compared with a structure in which a plurality of discontinuous stator parts are coupled with each other to configure one stator 130, the stator 130 of the present disclosure may be formed as one continuous body and have a bent structure, thereby preventing damage and lower performance caused by the vibration, and effectively adjusting the natural frequency of the stator 130.

The natural frequency of the stator 130 may be adjusted to prevent a resonance phenomenon of the motor assembly 100. The natural frequency of the stator 130 may be increased by changing a material of the electrical steel sheet of the stator 130, by coupling and fixing an additional structure to the stator 130, or through a reinforcement process. However, there is a limit to a correction range, and it is difficult to avoid the frequency of the high-speed motor.

It is possible to adjust a width of the connection area 133 and that of the body area 132 of the stator 130 formed as one continuous body as another method of adjusting the natural frequency of the stator 130, and the description describes a range of an adjustable width in detail.

Figure 5:
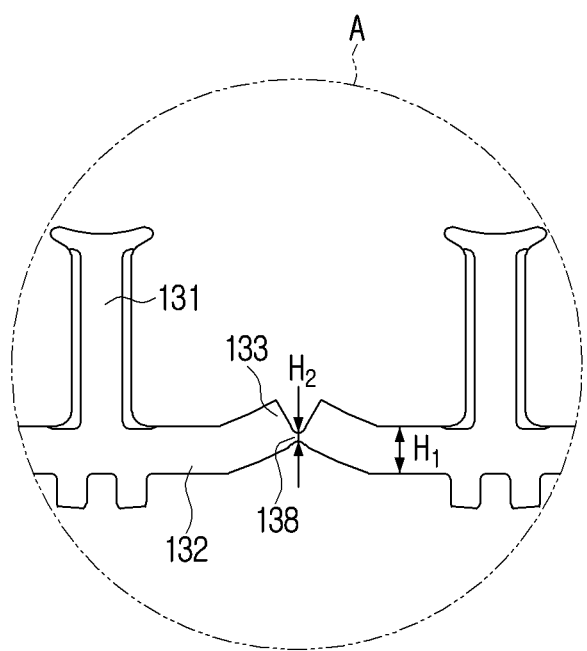
FIG. 5 is an enlarged cross-sectional view of area "A" of FIG. 4.

FIG. 5 is an enlarged cross-sectional view of area "A" of FIG. 4; and FIG. 6 is a table showing the natural frequency of the stator 130 based on a ratio of a second width $H_2$ to a first width $H_1$.

Referring to FIG. 5, in a cross-section of the stator 130 in a direction perpendicular to the rotational axis of the rotating shaft 141, each width of the plurality of body areas 132 may be the first width $H_1$ and each width of the bending points 138 of the plurality of connection areas 133 may be the second width $H_2$.

Taking the motor assembly 100 of the cleaner as an example, the motor assembly 100 including the four-pole rotor 140 of the cleaner used for home use may typically have 30,000 to 200,000 revolutions per minute (RPM). In this case, the rotation frequency of the motor assembly 100 may be 500 Hz or more and 3,333 Hz or less, and a frequency generation section of electromagnetic induced noise of the motor assembly 100 may be 2,000 Hz to 13,333 Hz.

Referring to FIG. 6, a result of measuring a natural frequency $f_0$ of the stator 130 may be confirmed by adjusting the ratio of the second width $H_2$ to the first width $H_1$.

When considering a frequency margin of about 10% in a result value of FIG. 6, the ratio of the second width $H_2$ to the first width $H_1$ to avoid the frequency generation section of the electromagnetic induced noise may be designed to be 25% or less.

If the ratio of the second width $H_2$ to the first width $H_1$ is 5%, stress applied to the bending point 138 of the plurality of connection areas 133 may be up to 140 MPa in an operation of bending the stator 130 formed as one continuous body. However, the electrical steel sheet which is the material of the stator 130 may have yield stress of around 215 MPa. Therefore, when the ratio of the second width $H_2$ to the first width $H_1$ is 5% or less, a safety factor of the stator 130 may thus drop to 50% or less, and the bending point 138 may be cut off in the bending process. Accordingly, a stable lower limit of the ratio of the second width $H_2$ to the first width $H_1$ may be set to 5%.

Therefore, when the ratio of the second width $H_2$ to the first width $H_1$ is in a range of 5% to 25% (i.e., 0.05 to 0.25), the stator 130 may be safely bent, and avoid a resonance frequency section. It is possible to prevent high-frequency noise occurring due to the resonance phenomenon by avoiding the resonance frequency section, and stably control and drive a driving operation of the motor assembly 100.

Although not shown in the experimental result of FIG. 6, the motor assembly 100 of the cleaner used for home use may have the revolutions per minute maintained in a similar section even when the rotor 140 included in the motor assembly 100 has two or four poles or more. Therefore, it may be expected that the resonance frequency generation section also does not deviate from a commercial range.

Figure 7:
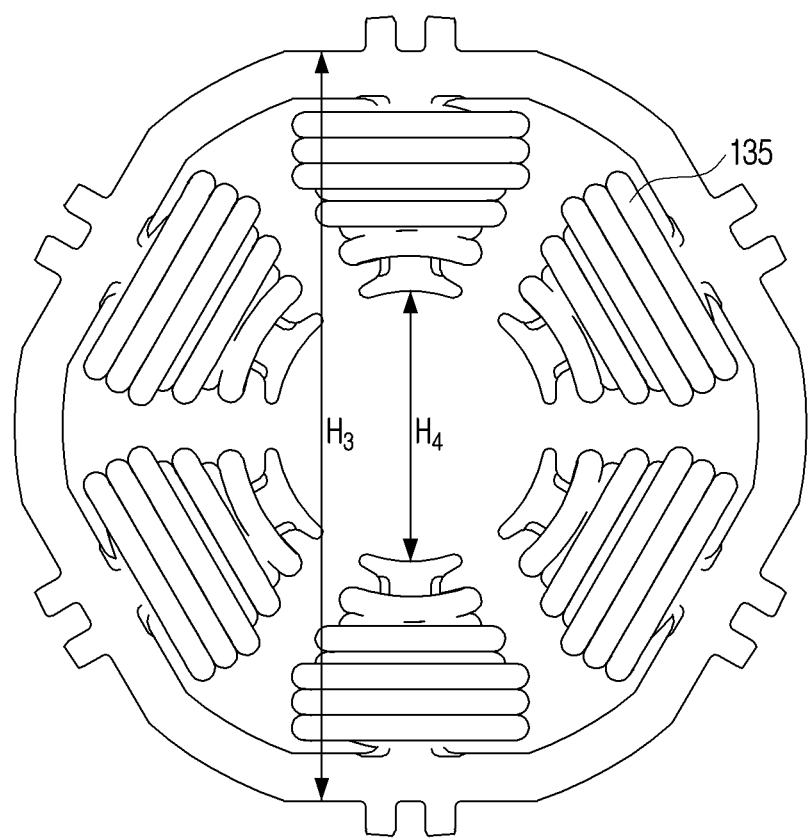
FIG. 7 is a plan view of the stator on which a coil is wound according to an embodiment of the present disclosure.

FIG. 7 is a plan view of the stator 130 on which the coil 135 is wound according to an embodiment of the present disclosure.

Referring to FIG. 7, in the cross-section of the stator 130 bent in the direction perpendicular to the rotational axis of the rotating shaft 141, the stator 130 may have an outer diameter of $H_3$ mm, and the plurality of teeth of the stator 130 may have an inner width of $H_4$ mm. The stator 130 included in the motor assembly having a smaller size according to an embodiment of the present disclosure may have outer diameter $H_3$ of 50 mm or less.

In a manufacturing process of the motor, the stator 130 may require a winding process in which a needle of a winding machine winds the coil 135 on the teeth area 131. In the conventional stator 130, the electrical steel sheets may be stacked on each other to achieve the stator 130 in a final form, whose both ends are connected with each other, the needle of the winding machine may be disposed in a center of the plurality of teeth areas 131 of the stator 130, and the needle or the stator 130 may be moved to wind the coil 135.

The plurality of teeth areas 131 of the stator 130 may be six or more for a three-phase motor having four or more poles of the rotor 140. However, the needle of the winding machine may be required to wind the coil 135 while being moved between the plurality of teeth areas 131, and the small stator 130 having the outer diameter $H_3$ of 50 mm or less may thus have a smaller distance $H_4$ in the center of the plurality of teeth areas 131. It is difficult for the winding machine to wind the coil 135 on the plurality of teeth areas 131 while being moved between the plurality of teeth areas 131, and there is thus a limit to make the stator 130 have a smaller size.

However, the stator 130 of the present disclosure may be formed in such a manner that the stator 130 is formed by being stacked as one continuous body and bent around the bent part. Therefore, it is possible to sufficiently secure a space between the plurality of teeth areas 131 in an operation before the stator is bent, the needle of the winding machine may easily wind the coil 135, and this manner may thus be efficiently applied to the small stator 130.

Figure 8A:
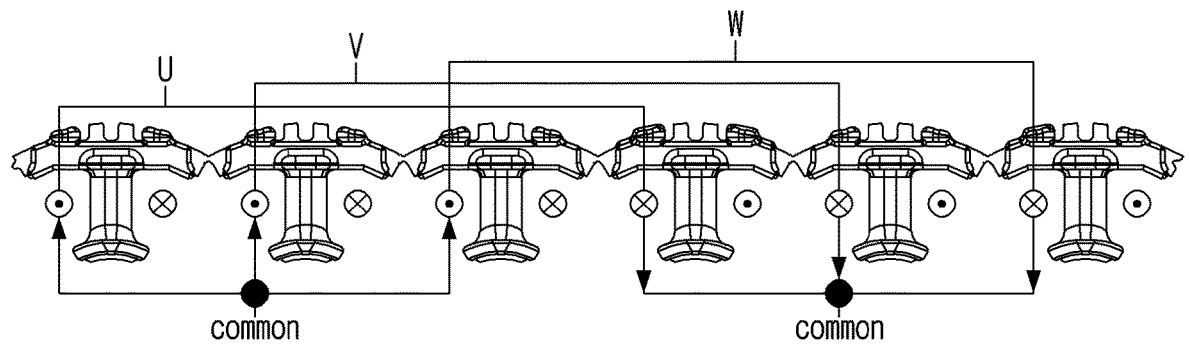
FIG. 8A is a view showing a connection method of the coil of the stator.
Figure 8B:
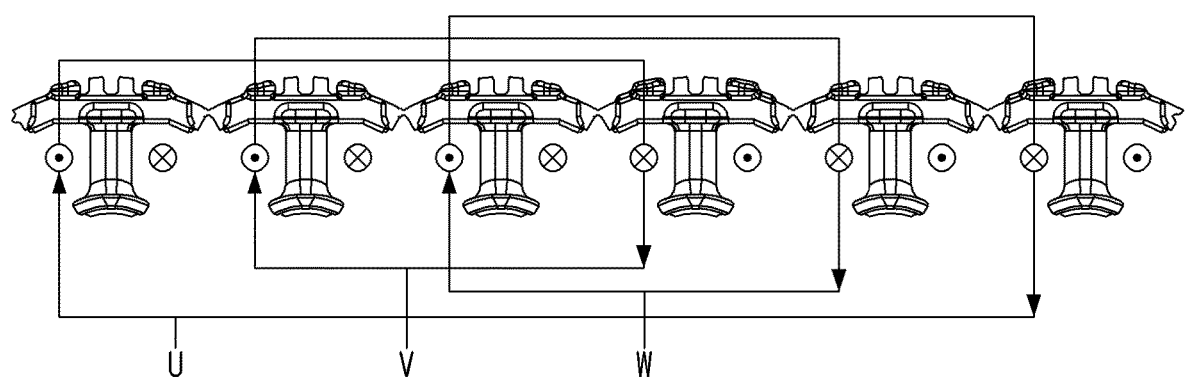
FIG. 8B is a view showing the connection method of the coil of the stator.

FIGS. 8A and 8B are views each showing a connection method of the coil 135 of the stator 130.

Referring to FIGS. 8A and 8B, the coil 135 according to an embodiment of the present disclosure may be supplied with a three-phase current, and may be Y-connected or delta-connected.

FIG. 8A shows the Y-connection method in which the three-phase coil 135 wound on the stator 130 of the motor assembly 100 may be Y-connected, and a neutral point may be required at each center of both ends of each coil 135. The motor assembly 100 using such a connection method may have a structure of FIG. 9.

On the other hand, FIG. 8B shows the delta connection of the three-phase coil 135 wound on the stator 130 of the motor, and both the ends of the coil are interconnected, thus omitting the neutral point. The motor assembly 100 according to an embodiment of the present disclosure using such a connection method may have a structure of FIG. 10.

Figure 9:
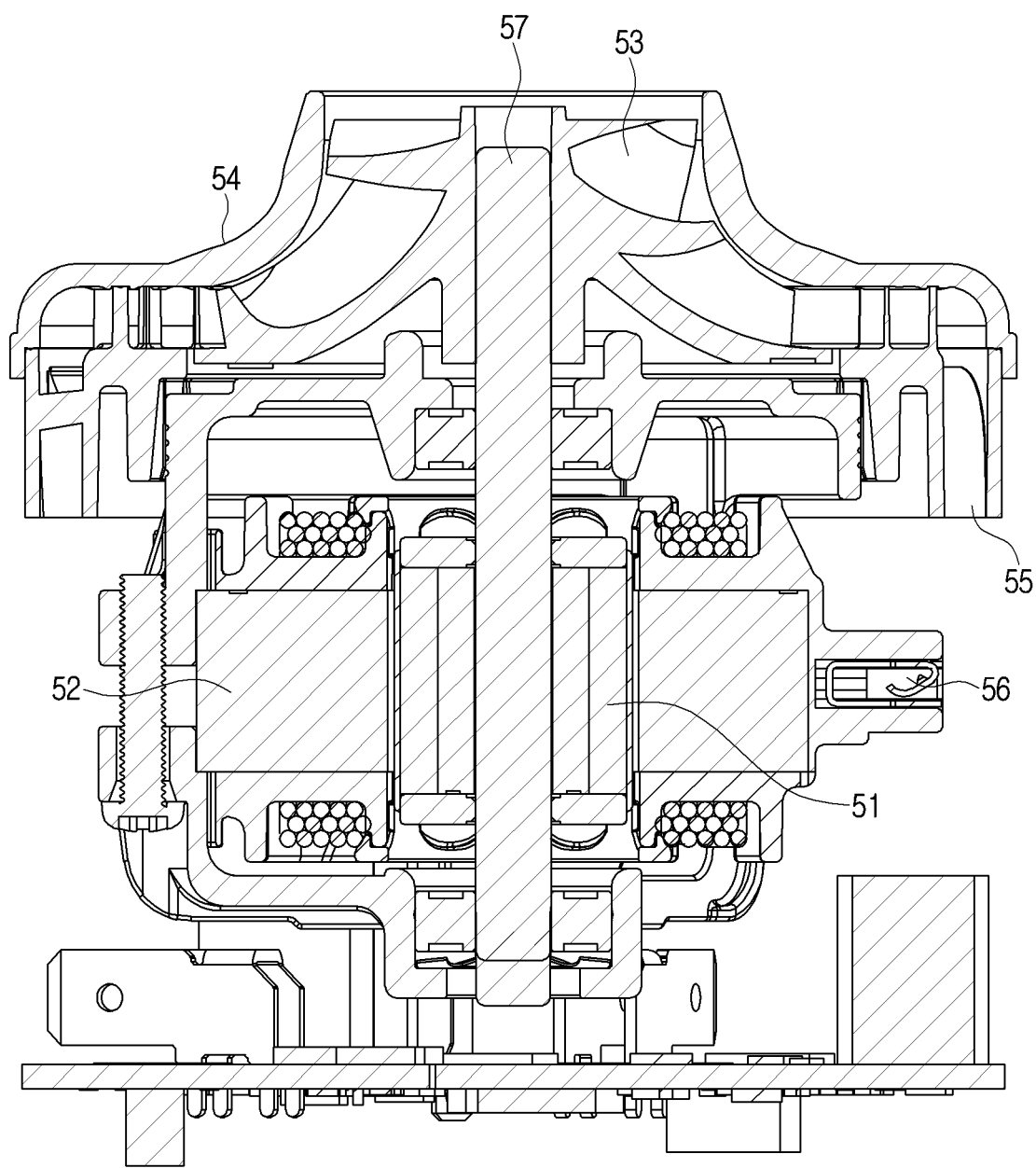
FIG. 9 is a cross-sectional view of the motor assembly according to an embodiment of the present disclosure.
Figure 10:
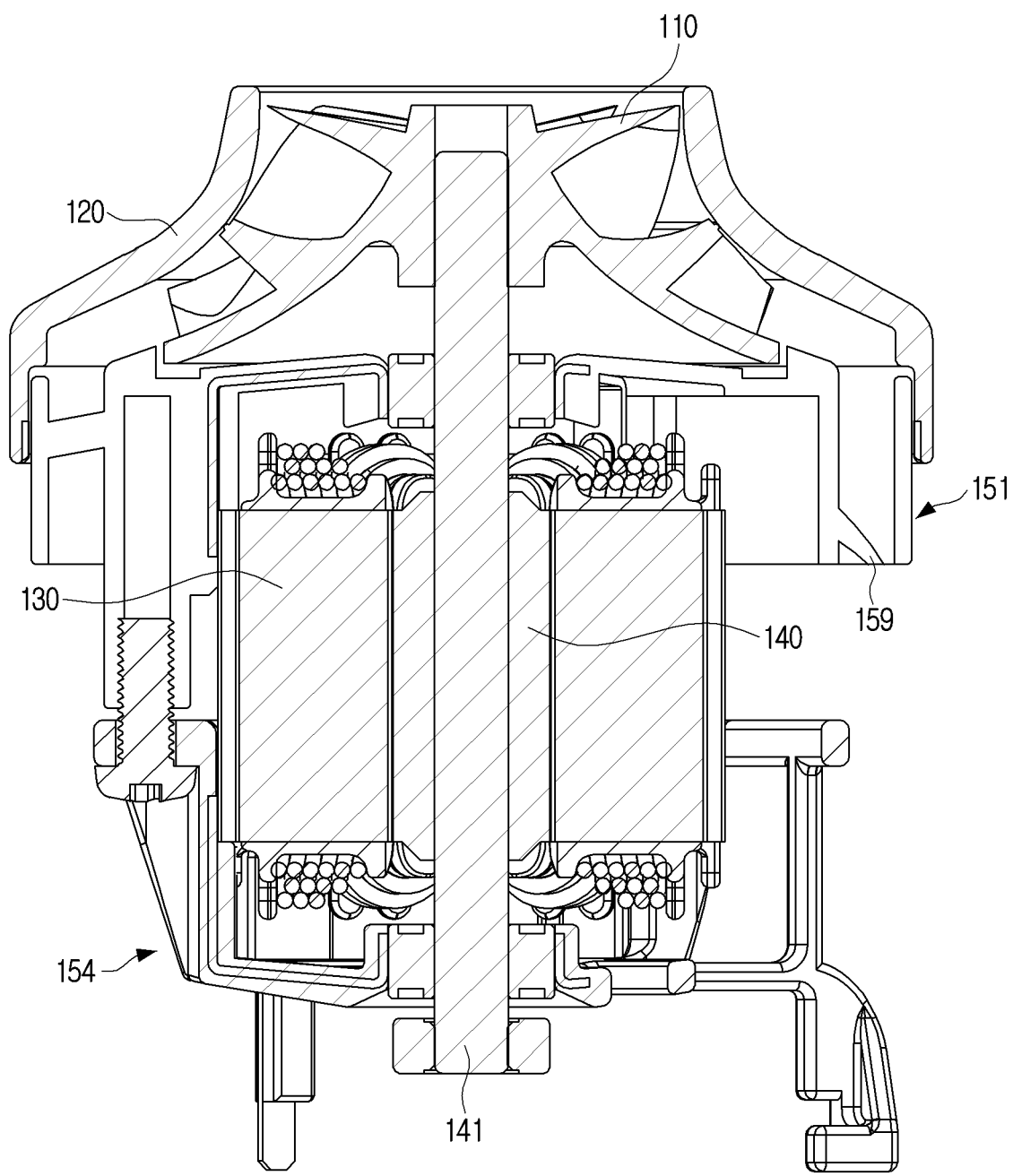
FIG. 10 is the cross-sectional view of the motor assembly according to an embodiment of the present disclosure.

FIGS. 9 and 10 are cross-sectional views of the motor assembly according to an embodiment of the present disclosure.

Referring to FIG. 9, the motor assembly may further include a neutral member 56.

The neutral member 56 may correspond to the neutral point of the Y-connected three-phase coil 135. The neutral member may be disposed on an outer circumferential surface of a stator 52, the stator 52 may thus have a large volume and a greater weight. Therefore, air discharged from an outlet 55 may be discharged toward the neutral member 56, thus preventing a smooth air flow.

Referring to FIG. 10, the motor assembly 100 according to an embodiment of the present disclosure may not include the conventional neutral member 56 using the delta connection. In addition, a space where the stator 130 is disposed between the first housing 151 and second housing 154 of the motor assembly 100, including the stator 130 having a smaller size according to an embodiment of the present disclosure, may have a smaller diameter.

As a result, there is no component that obstructs the air flow in an air flow direction of the outlet 159, and the outlet 159 disposed on an upper part of the stator 130 may discharge air to the outside of an outer circumferential surface of the motor assembly 100.

In addition, there is no component that obstructs the air flow in an air flow direction of the outlet 55, an amount of air discharged per unit time may thus be increased. Simultaneously, an amount of air introduced into the motor assembly per unit time may also be increased, thus improving performance of the motor assembly. In addition, resistance to the air flow direction may be reduced to reduce the noise. Therefore, noise reduction and further improved performance may be expected for the same power consumption of the motor of the motor assembly 100 and the same revolutions per minute.

In the motor assembly 100 according to an embodiment of the present disclosure, the housings 151 and 154 may guide air from the impeller 110 to the outlet 159. In this case, the outlet 159 may be formed as one body with the first housing 151 disposed on the upper part, and in this case, the first housing 151 may have a diameter of 55 mm or less.

The motor assembly 100 including the neutral member 56 shown in FIG. 9 may have an individual guide structure for guiding air to the outlet 55 positioned below the impeller cover 54 of the impeller 53. However, the first housing 151 shown in FIG. 10 may support the stator 130 and include the outlet 159 simultaneously to guide air from the impeller 110 to the outlet 159.

Although the various embodiments of the present disclosure have been individually described hereinabove, the respective embodiments are not necessarily implemented alone, and may also be implemented so that configurations and operations thereof are combined with those of one or more other embodiments.

In addition, although the embodiments are shown and described in the present disclosure as above, the present disclosure is not limited to the above mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:
1. A motor assembly comprising:
a rotor rotatable about a rotating shaft;
a stator formed as one continuous body, and including
a plurality of teeth areas,
a plurality of body areas disposed outside the plurality of teeth areas and having a first width in a cross section of the stator in a direction perpendicular to a rotational axis of the rotating shaft, with the plurality of teeth areas extending from the plurality of body areas in a direction toward the rotating shaft, and a plurality of connection areas connecting the plurality of body areas with each other; and a coil wound on each of the plurality of teeth areas, wherein each of the plurality of connection areas includes a bending point having a second width in the cross section of the stator in the direction perpendicular to the rotational axis of the rotating shaft of greater than or equal to 0.075 and less than or equal to 0.25 of the first width such that the motor assembly is configured to have a natural frequency of less than or equal to 1824 Hz.

2. The motor assembly as claimed in claim 1, wherein each of the plurality of body areas is bent twice in the direction toward the rotating shaft.

3. The motor assembly as claimed in claim 1, wherein one connection area among the plurality of connection areas has a protruding area disposed in an area in contact with another connection area among the plurality of connection areas, and the another connection area has a receiving area positioned opposite to the protruding area and receiving the protruding area.

4. The motor assembly as claimed in claim 1, wherein the motor assembly is rotatable at 30,000 to 200,000 revolutions per minute (RPM).

5. The motor assembly as claimed in claim 1, wherein the rotor has four or more poles.

6. The motor assembly as claimed in claim 1, wherein the stator has a diameter of 50 mm or less.

7. The motor assembly as claimed in claim 1, further comprising:

an insulator surrounding the stator, wherein the coil is wound on the insulator.

8. The motor assembly as claimed in claim 1, further comprising:

an impeller having a plurality of blades and connected to the rotating shaft; and a housing including an outlet configured to discharge air suctioned into the impeller and supporting the stator.

9. The motor assembly as claimed in claim 8, wherein the coil is suppliable with a three-phase current and is delta-connected, and the outlet is configured to discharge air to an outside of an outer circumferential surface of the motor assembly.

10. A cleaner comprising:

a cleaner body;

a suction head configured to suction a foreign material on a surface to be cleaned into the cleaner body; and a motor assembly disposed in the cleaner body and configured to provide suction power to the suction head, wherein the motor assembly includes:

a rotor rotatable about a rotating shaft;

a stator formed as one continuous body, and including a plurality of teeth areas, a plurality of body areas disposed outside the plurality of teeth areas and having a first width in a cross section of the stator in a direction perpendicular to a rotational axis of the rotating shaft, with the plurality of teeth areas extending from the plurality of body areas in a direction toward the rotating shaft, and a plurality of connection areas connecting the plurality of body areas with each other; and a coil wound on each of the plurality of teeth areas, wherein each of the plurality of connection areas includes a bending point having a second width in the cross section of the stator in the direction perpendicular to the rotational axis of the rotating shaft of greater than or equal to 0.075 and less than or equal to 0.25 of the first width such that the motor assembly is configured to have a natural frequency of less than or equal to 1824 Hz.

11. The cleaner as claimed in claim 10, wherein one connection area among the plurality of connection areas has a protruding area disposed in an area in contact with another connection area among the plurality of connection areas, and the another connection area has a receiving area positioned opposite to the protruding area and receiving the protruding area.

12. The cleaner as claimed in claim 10, wherein the motor assembly is rotatable at 30,000 to 200,000 revolutions per minute (RPM).

13. The cleaner as claimed in claim 10, wherein the stator has a diameter of 50 mm or less.

14. The cleaner as claimed in claim 10, further comprising:

an impeller having a plurality of blades and connected to the rotating shaft; and a housing including an outlet to discharge air suctioned into the impeller and supporting the stator.

15. The cleaner as claimed in claim 14, wherein the coil is suppliable with a three-phase current and is delta-connected, and the outlet is configured to discharge air to outside of an outer circumferential surface of the motor assembly.

* * * * *